(No Model.)
J. A. ROGERS.
SASH BALANCE.
No. 389,248. Patented Sept. 11, 1888.
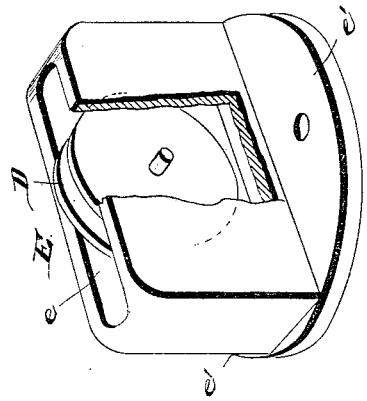
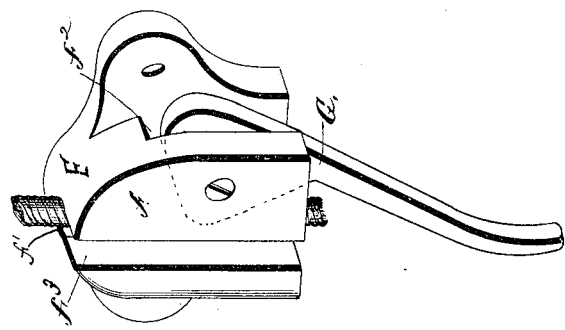
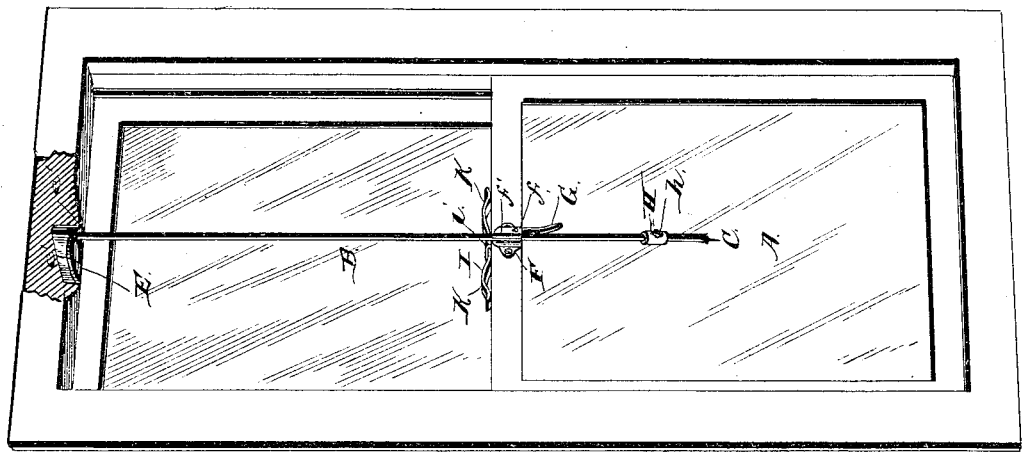
Witnesses:
Geo. J. Prowse.
C. E. Doyle.
Inventor,
J. A. Rogers.
By his Attorneys
C. A. Snow & Co.

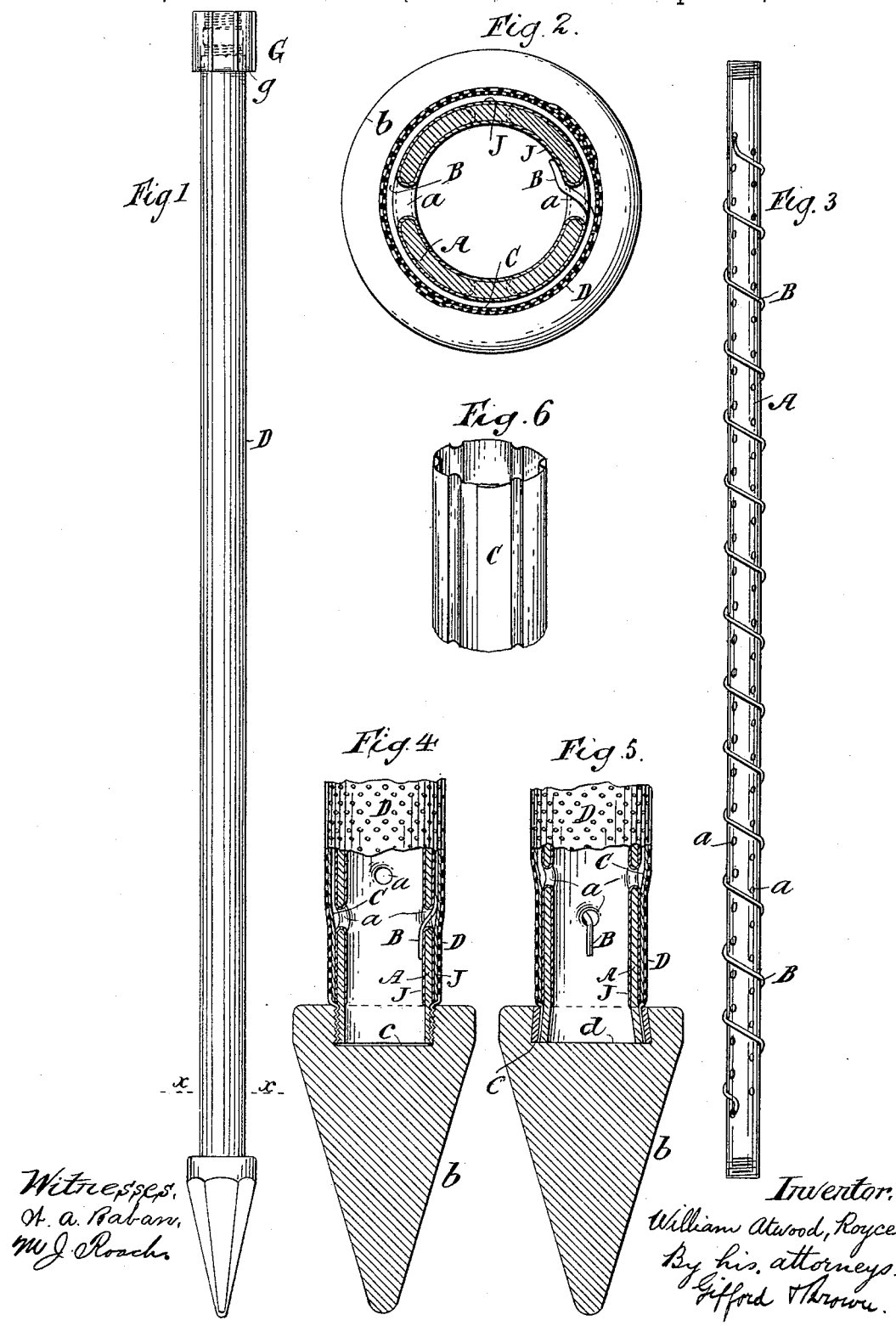

dow-frame, and extending through the opening in the clamp, and the adjustable stop secured on the running portion of the cord near its free end and adapted to bear against the lower side of the clamp, substantially as specified.

In testimony that I claim the foregoing as my own I have hereto affixed my signature in presence of two witnesses.

JOHN ALEN ROGERS.

Witnesses:
D. W. DAY,
R. H. BOTELER.